US010222649B2

(12) United States Patent
Sugiyama et al.

(10) Patent No.: US 10,222,649 B2
(45) Date of Patent: Mar. 5, 2019

(54) BACKLIGHT UNIT AND LIQUID CRYSTAL DISPLAY DEVICE COMPRISING THE SAME

(71) Applicant: Japan Display Inc., Tokyo (JP)

(72) Inventors: Ken Sugiyama, Tokyo (JP); Koji Hiramoto, Tokyo (JP); Taketoshi Masamoto, Tokyo (JP); Kazunari Nishita, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/823,876

(22) Filed: Nov. 28, 2017

(65) Prior Publication Data

US 2018/0149922 A1    May 31, 2018

(30) Foreign Application Priority Data

Nov. 28, 2016 (JP) ................................. 2016-230169

(51) Int. Cl.
*G09F 13/04* (2006.01)
*G02F 1/1335* (2006.01)

(52) U.S. Cl.
CPC .............. *G02F 1/133603* (2013.01); *G02F 2001/133607* (2013.01)

(58) Field of Classification Search
CPC ......... G02F 1/133608; G02F 1/133308; G02F 2001/133314; G02F 1/133603; G02F 1/133604; G02B 6/0088
USPC ............................................. 362/97.1–97.4
See application file for complete search history.

(56) References Cited

U.S. PATENT DOCUMENTS

| 6,219,117 | B1  | 4/2001  | Nagakubo et al. |
| 6,313,891 | B1  | 11/2001 | Nagakubo et al. |
| 7,033,063 | B2* | 4/2006  | Cha ..................... G02B 6/0071 349/58 |
| 7,905,615 | B2* | 3/2011  | Abo .................. G02F 1/133604 349/67 |
| 8,169,563 | B2* | 5/2012  | Lee ................... G02F 1/133308 349/58 |

(Continued)

FOREIGN PATENT DOCUMENTS

| JP | 10-170919 A | 6/1998 |
| JP | 2010-026216 A | 2/2010 |
| JP | 5122657 A | 1/2013 |

(Continued)

OTHER PUBLICATIONS

Taiwan Office Action for corresponding Application No. 106139656, dated Sep. 11, 2018.

*Primary Examiner* — Jamara Franklin
(74) *Attorney, Agent, or Firm* — K&L Gates LLP

(57) ABSTRACT

According to one embodiment, a backlight device includes a support frame including a first frame body including a pair of first frame members and a second frame member connected to respective ends of the first frame members and a second frame body being separate from the first frame body, which connects other respective ends of the first frame members to each other, a reflective sheet on the support frame, a light guide on the reflective sheet within the support frame, an optical sheet on the light guide, and a light source unit in the support frame. The light source unit includes a wiring board on the second frame body and a light source on the wiring board, opposing an incidence surface of the light guide.

14 Claims, 10 Drawing Sheets

(56) References Cited

U.S. PATENT DOCUMENTS

2011/0285934 A1   11/2011   Watanabe
2012/0320629 A1   12/2012   Lim et al.

FOREIGN PATENT DOCUMENTS

TW    M327036 U    2/2008
TW    201346393 A  11/2013

* cited by examiner

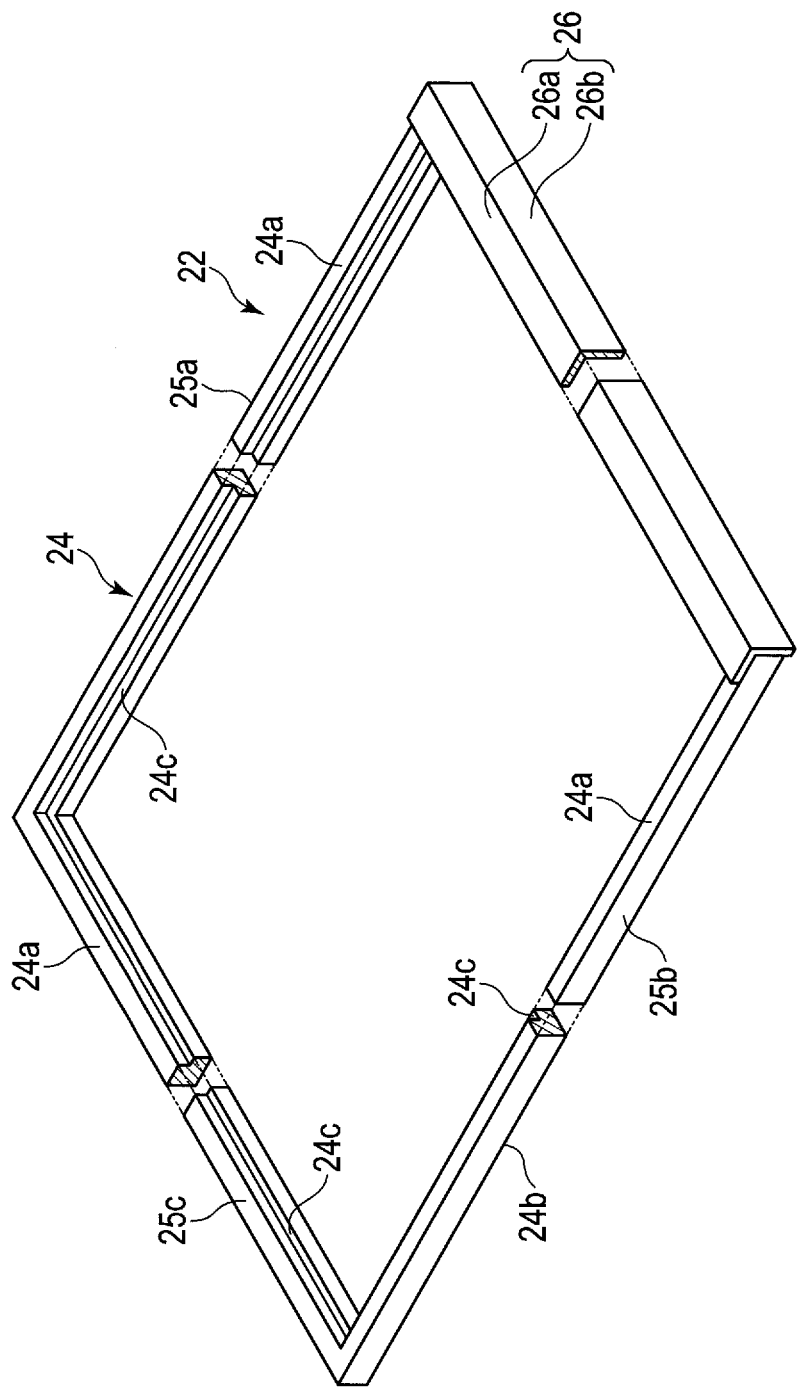
F I G. 5

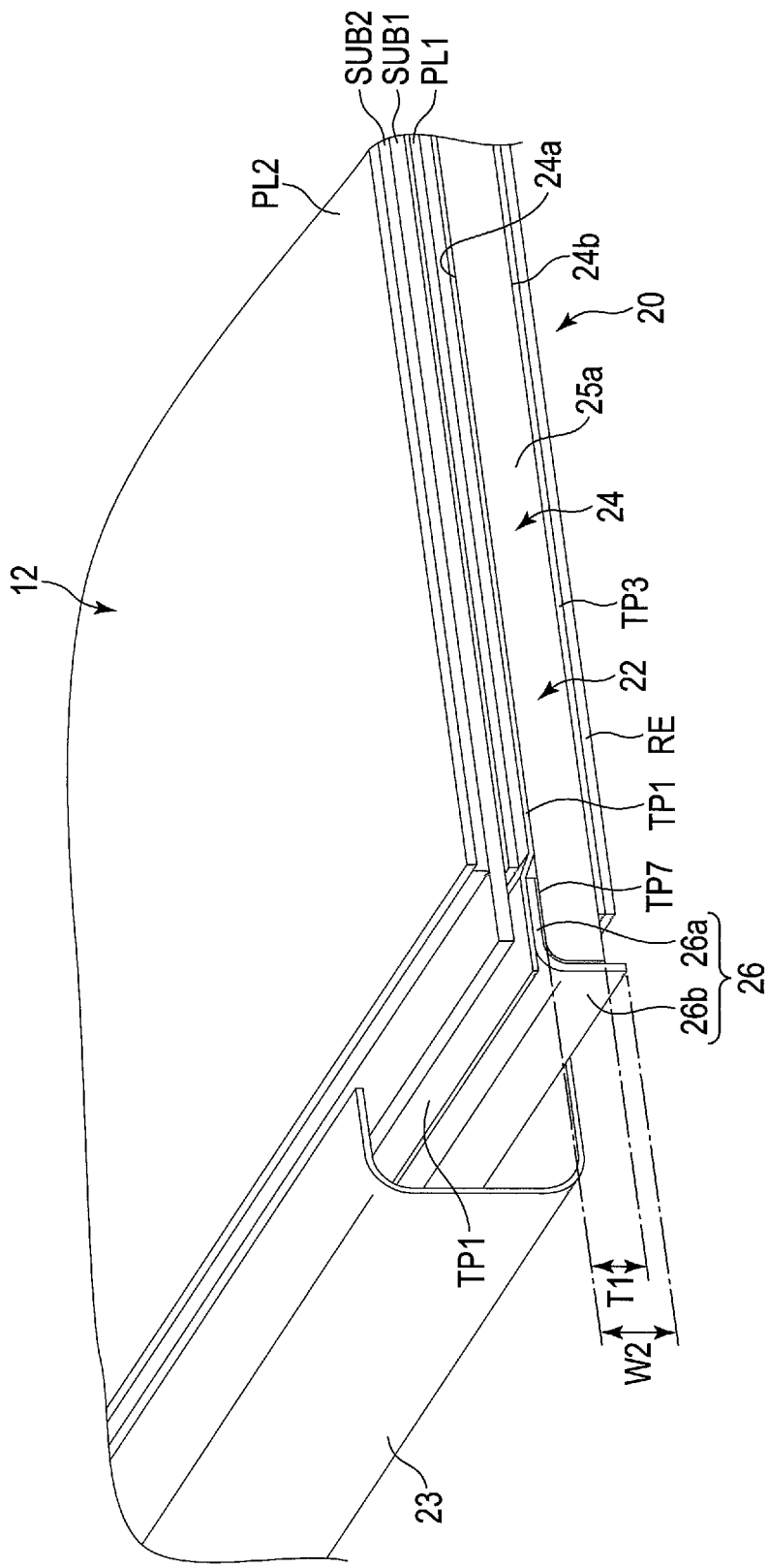
F I G. 7

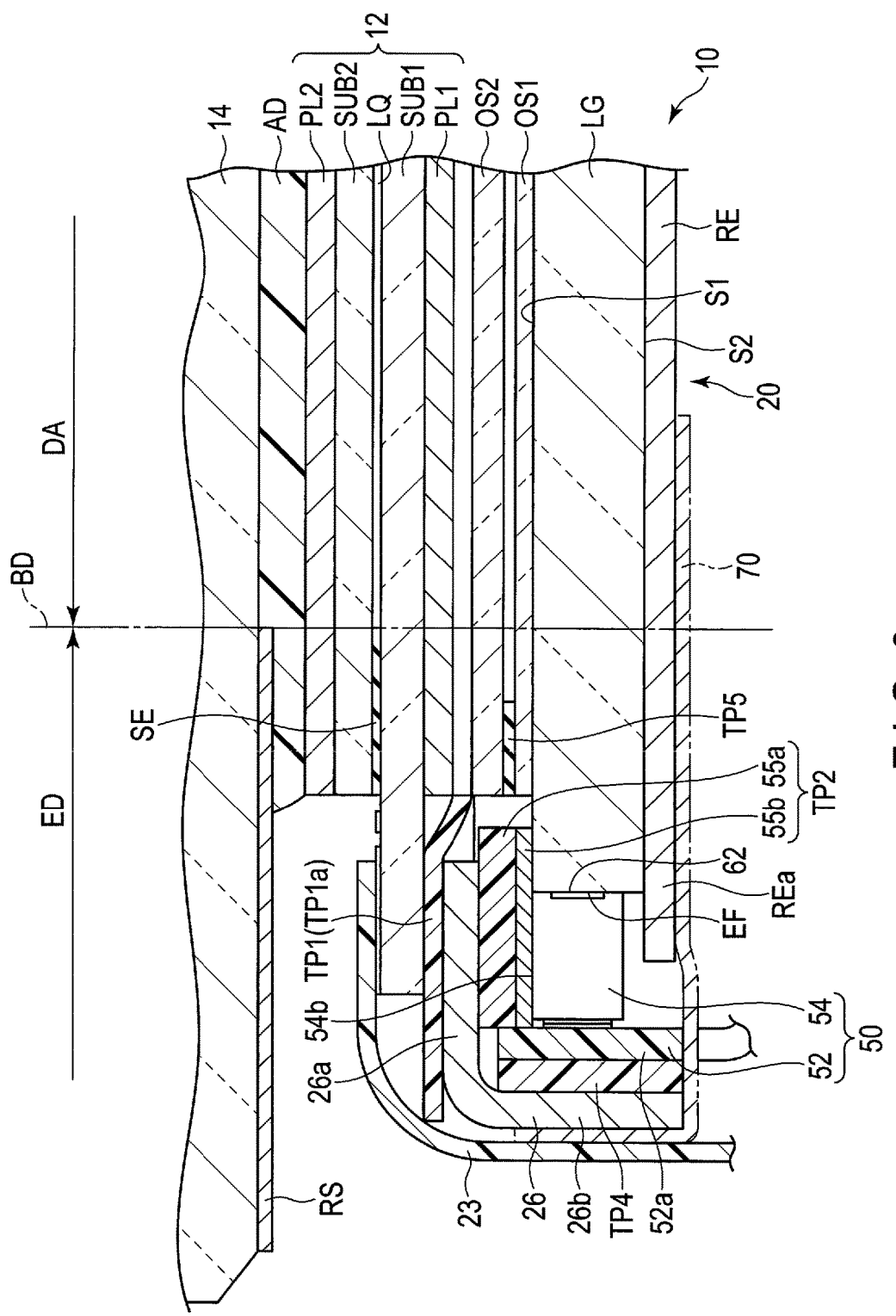
F I G. 8

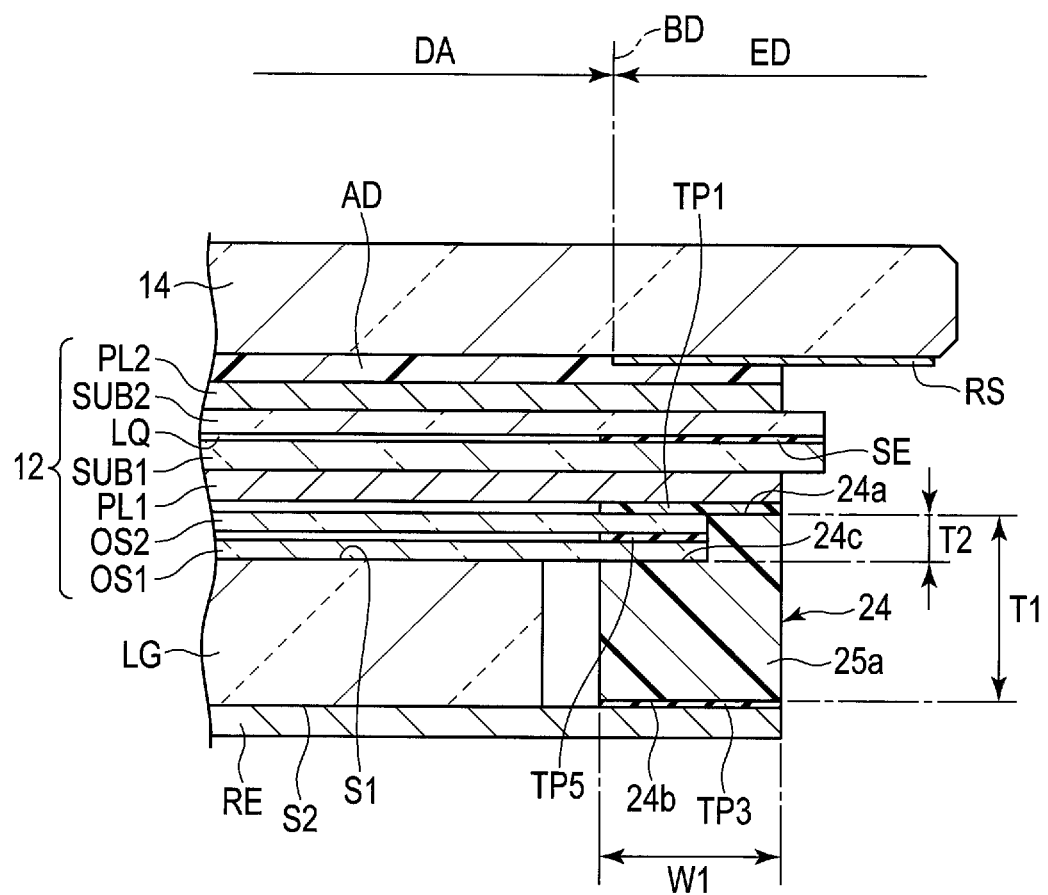
F I G. 9

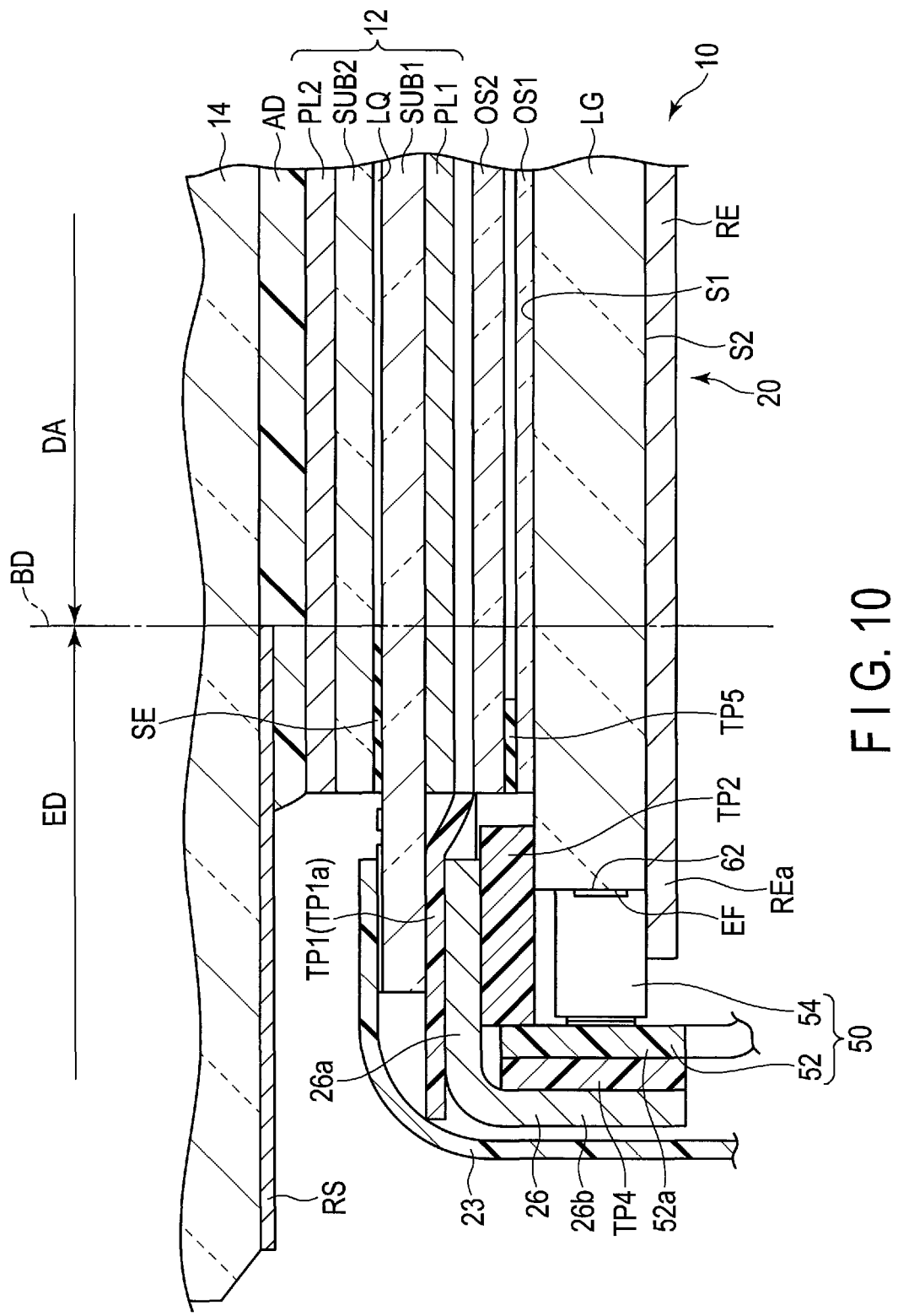
F I G. 10

BACKLIGHT UNIT AND LIQUID CRYSTAL DISPLAY DEVICE COMPRISING THE SAME

CROSS-REFERENCE TO RELATED APPLICATIONS

This application is based upon and claims the benefit of priority from Japanese Patent Application No. 2016-230169, filed Nov. 28, 2016, the entire contents of which are incorporated herein by reference.

FIELD

Embodiments described herein relate generally to a backlight device and a liquid crystal display device comprising the same.

BACKGROUND

In recent years, liquid crystal display devices are widely used as a display device of smartphones, tablet computers, vehicle-navigation systems, etc. In general, a liquid crystal display device comprises a liquid crystal display panel and a backlight device overlaid on the rear surface of the liquid crystal display panel and illuminates the liquid crystal display panel. The backlight device includes a reflective layer, a light guide, an optical sheet, a light source unit which irradiates light which enters the light guide. The reflective layer, light guide and optical sheet are stacked one on another. The backlight device further includes a case (bezel) made from a metal plate, which accommodates these members. The light source unit includes a wiring board and a plurality of light sources, for example, light-emitting diodes (LEDs) mounted on the wiring board.

In recent years, as display areas have increased, there has been a continual demand for the frames of liquid crystal display devices to become ever narrower and the liquid crystal display devices to become ever thinner.

SUMMARY

The present disclosure generally relates to a backlight device and a liquid crystal display device.

According to one embodiment, a backlight device includes a support frame including a first frame body including a pair of first frame members and a second frame member connected to respective ends of the first frame members and a second frame body being separate from the first frame body, which connects other respective ends of the first frame members to each other, a reflective sheet on the support frame, a light guide on the reflective sheet within the support frame, an optical sheet on the light guide, and a light source unit in the support frame. The light source unit includes a wiring board on the second frame body and a light source on the wiring board, opposing an incidence surface of the light guide.

Additional features and advantages are described herein, and will be apparent from the following Detailed Description and the figures.

BRIEF DESCRIPTION OF THE DRAWINGS

FIG. 5 is a partially enlarged perspective view showing a part of a support frame of the backlight device.

FIG. 7 is a perspective view showing a light source-side end portion of the liquid crystal display device.

FIG. 8 is a cross sectional view showing the light source-side end portion of the liquid crystal display device exploded along line A-A of FIG. 1.

FIG. 9 is a cross sectional view showing a long side end portion of the liquid crystal display device exploded along line B-B of FIG. 1.

FIG. 10 is a cross sectional view showing a light source-side end portion of a liquid crystal display device of another embodiment.

DETAILED DESCRIPTION

Various embodiments will be described hereinafter with reference to the accompanying drawings. In general, according to one embodiment, a backlight device comprises: a support frame comprising a first frame body including a pair of first frame members opposing each other and a second frame member connected to respective ends of the first frame members, and a second frame body formed to be separate from the first frame body, which connects other respective ends of the first frame members to each other; a reflective sheet on a first surface of the support frame; a light guide on the reflective sheet within the support frame; an optical sheet on the light guide; and a light source unit in the support frame, comprising a wiring board fixed on the second frame body and a light source on the wiring board, opposing an incidence surface of the light guide.

Note that the disclosure is presented for the sake of exemplification, and any modification and variation conceived within the scope and spirit of the invention by a person having ordinary skill in the art are naturally encompassed in the scope of invention of the present application. Furthermore, a width, thickness, shape, and the like of each element are depicted schematically in the figures as compared to actual embodiments for the sake of simpler explanation, and they do not limit the interpretation of the invention of the present application. Furthermore, in the description and figures of the present application, structural elements having the same or similar functions will be referred to by the same reference numbers and detailed explanations of them that are considered redundant may be omitted.

EMBODIMENTS

Figure 1:
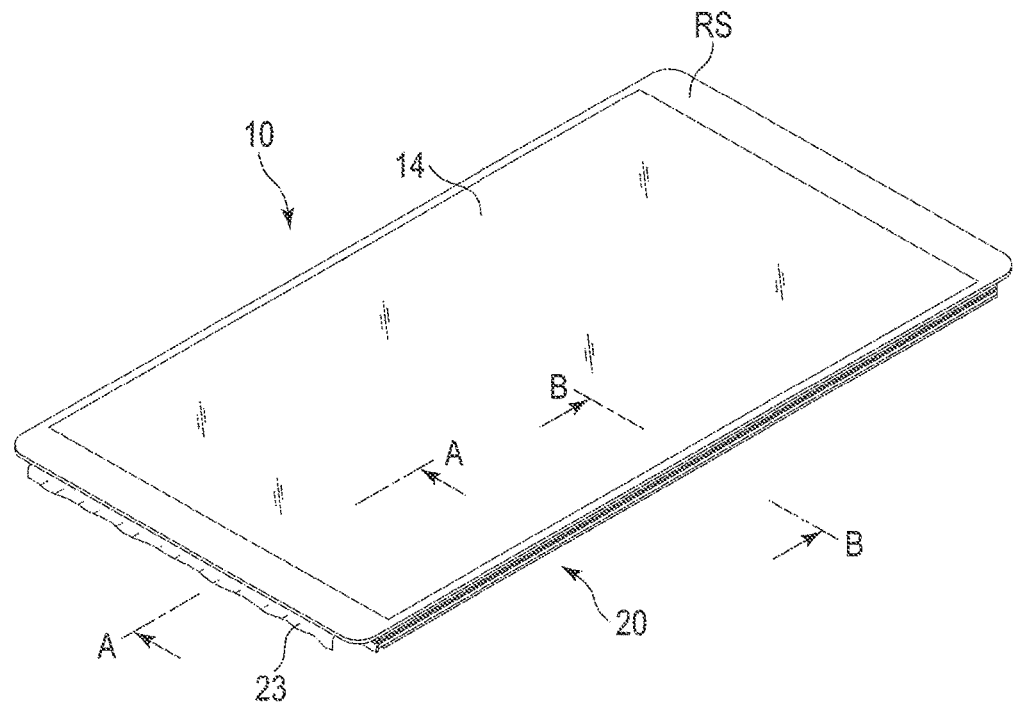
FIG. 1 is a perspective view showing a display surface side of a liquid crystal display device of an embodiment.
Figure 2:
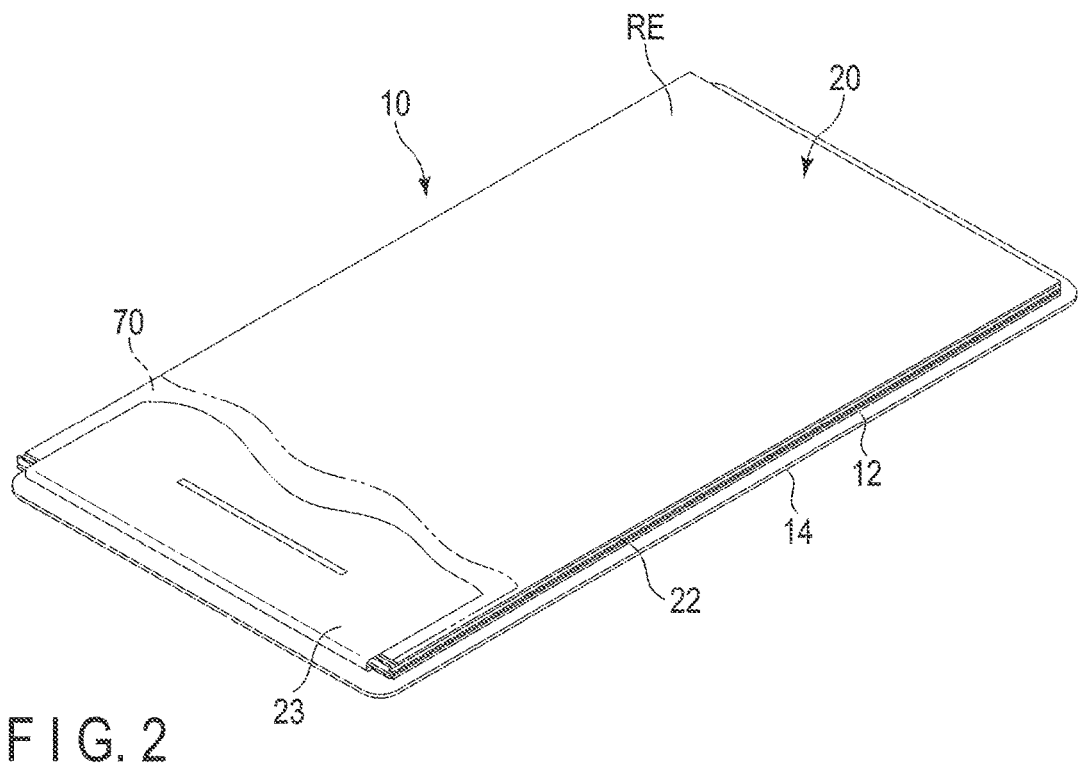
FIG. 2 is a perspective view showing a rear surface side of the liquid crystal display device.
Figure 3:
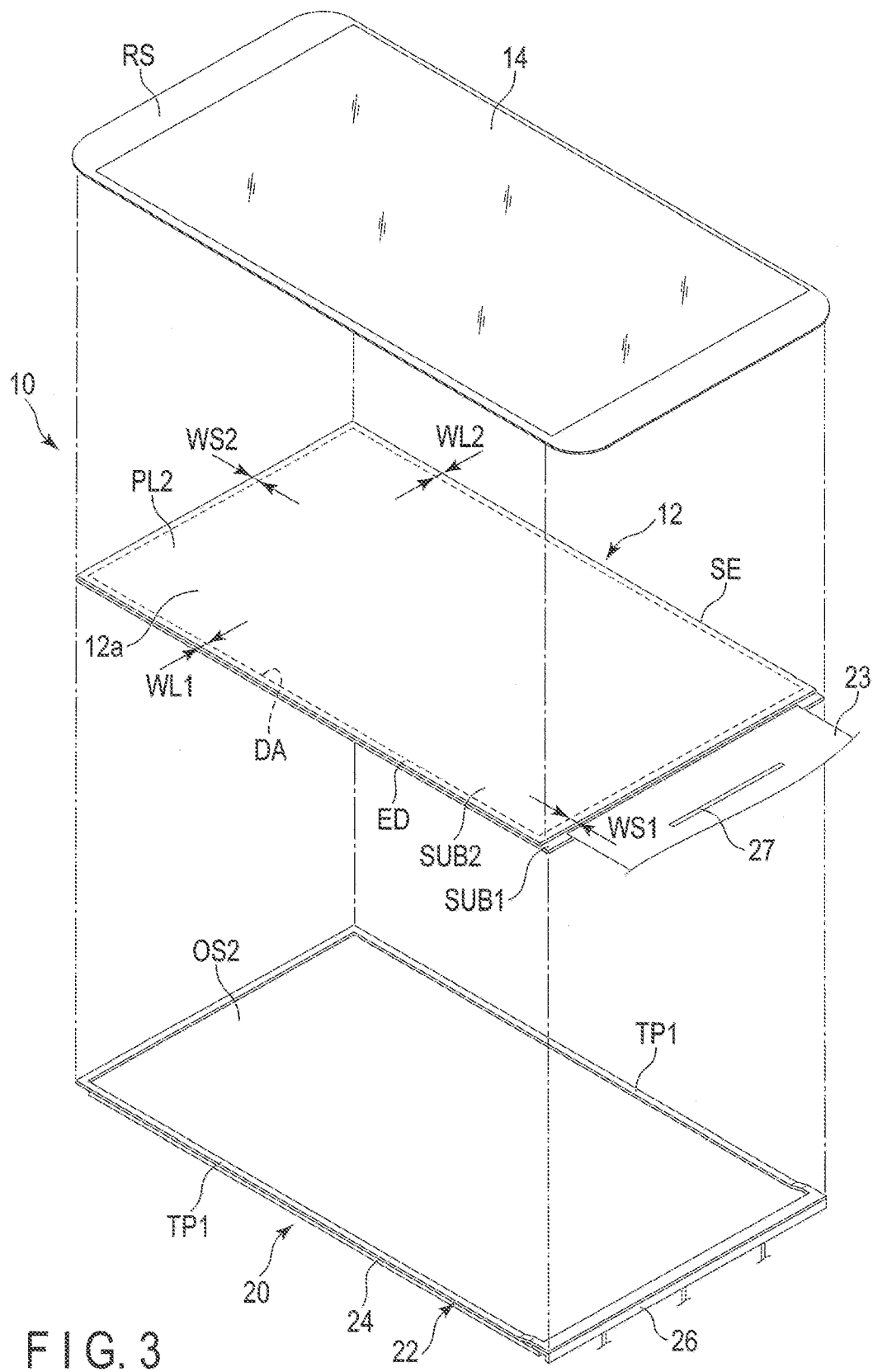
FIG. 3 is an exploded perspective view of the liquid crystal display device.

FIGS. 1 and 2 are perspective views showing, respectively, a display surface side and a rear side of a liquid crystal display device according to an embodiment. FIG. 3 is an exploded perspective view of the liquid crystal display device.

A liquid crystal display device 10 can be incorporated into, for example, various kinds of electronic devices, such as smartphones, tablet computers, mobile phones, notebook PCs, portable game consoles, electronic dictionaries, television sets and car-navigation systems, to be used.

As shown in FIGS. 1, 2 and 3, the liquid crystal display device 10 comprises an active-matrix liquid crystal panel 12, a transparent cover panel 14 overlaid on a display surface 12a, which is one flat surface of the liquid crystal panel 12 and configured to cover the entire display surface 12a, and a backlight device 20 provided to face the rear surface, which is the other flat surface of the liquid crystal panel 12.

The liquid crystal panel 12 comprises a rectangular plate shaped first substrate SUB1, a rectangular plate shaped second substrate SUB2 opposed to the first substrate SUB1, and a liquid crystal layer LQ held between the first substrate SUB1 and the second substrate SUB2. A circumferential portion of the second substrate SUB2 is attached to the first substrate SUB1 with a frame-shaped sealing member SE. On the surface of the second substrate SUB2, a polarizer PL2 is attached to form the display surface 12a. A polarizer PL1 is attached on a rear surface (a back of the liquid crystal panel 12) of the first substrate SUB1.

The liquid crystal panel 12 comprises a rectangular display area (active area) DA for displaying images, and a rectangular frame area (non-display area) ED provided around the display area DA. The display area DA is provided in a region inner side of the sealing member SE as the liquid crystal panel 12 is seen in plan view (which is a view of the liquid crystal panel from the normal direction of the display surface of the panel). The liquid crystal panel 12 is a transmissive liquid crystal panel having a transmissive display function of displaying imaging by selectively transmitting or modulating the light from the backlight device 20 in the display area DA. The liquid crystal panel 12 may have a structure provided for the lateral electric field mode which mainly utilizes a lateral electric field substantially parallel to a surface of the substrate, or a structure provided for the vertical electric field mode which mainly utilizes a vertical electric field crossing the main surface of the substrate.

In the example illustrated, a flexible printed circuit board (FPC) 23 is joined to a short edge-side end of the first substrate SUB1 and extends from the liquid crystal panel 12 outward. On the FPC 23, semiconductor devices including a driver IC 24 are mounted as signal supply sources which supply signals necessary to drive the liquid crystal panel 12. As shown in FIG. 2, the FPC 23 is folded over along a short edge of the first substrate SUB1 and overlaid on a bottom surface of the backlight device 20.

As shown in FIGS. 1 and 3, the cover panel 14 is formed into a rectangular plate shape from glass or an acrylic transparent resin, for example. The cover panel 14 has dimensions (width and length) greater than those of the liquid crystal panel 12 and an area greater than that of the liquid crystal panel 12 in planar view. The lower surface (rear surface, surface on a liquid crystal panel side) of the cover panel 14 is adhered to the display surface 12a of the liquid crystal panel 12 with an adhesive layer made from a transparent adhesives or adhesive, for example, and covers the entire display surface 12a.

A frame-shaped light-shielding layer RS is formed on the lower surface of the cover panel 14. In the cover panel 14, a region other than the region which opposes the display area DA is shielded by the light-shielding layer RS. The light-shielding layer RS may be formed on the upper surface (outer surface) of the cover panel 14. Note that the cover panel 14 may be omitted according to the use status of the liquid crystal display device 10.

The backlight device 20 comprises a rectangular support frame 22, and optical members and a light source unit 50 provided in the support frame 22. The backlight device 20 is disposed to oppose the rear surface of the liquid crystal panel 12 and attached to the rear surface with a frame-shaped adhesive member, for example, a double-stick tape TP1.

As shown in FIG. 3, in this embodiment, the widths of the side edges of the rectangular frame-shaped non-display area ED are all the same or substantially the same. More specifically, widths WL1 and WL2 of the non-display area ED, which correspond to a pair of long side edges of the display area DA are equal to each other (WL1=WL2). Note here that the widths WL1 and WL2 are referred to as the distance from the boundary between the display area DA and the non-display area ED to the end edge of the first substrate SUB1 (and the second substrate SUB2) in the long side edges of the display area DA. Moreover, of a pair of short side edges of the display area DA, the width of the non-display area ED on a side where the FPC 23 is provided (which may be referred to as the mounting side, hereafter) is defined as WS1, and the width of the non-display area ED on a short side edge opposite thereto is defined as WS2. Here, WS1/WS2≤2.0 is preferable. More preferably, WS1/WS2≤1.5, and still more preferably, WS1/WS2≤1.0 can be adopted. Here, the width WS1 is defined as the distance from the boundary between the display area DA and the non-display area ED to the end edge of the first substrate SUB1 in the short-edge side on the mounting side. The width WS2 is defined as the distance from the boundary of the display area DA and the non-display area ED to the end edge of the first substrate SUB1 (and the second substrate SUB2) in the short-edge side opposite to the mounting side.

Moreover, the above-described structures should preferably satisfy: WL1=WL2<1.5 mm and WS2<1.5 mm, and more preferably, WL1=WL2<1.0 mm and WS2<1.0 mm. Furthermore, in any of these structures, WL1=WL2=WS2 can be adopted.

With the above-described conditions, this embodiment can achieve such a structures that the width WS1 of the mounting side of the liquid crystal panel 12 can be remarkably narrowed than the conventional technique, i.e., the width WS1 of the non-display area ED on the mounting side can be made substantially equal to that of the other regions of the non-display area ED. Thus, such a liquid crystal panel 12 can be provided with a narrowed frame in which the widths of all the sides of the non-display area ED which surrounds the display area DA are all substantially the same.

Next, the backlight device 20 will be described in more detail. In order to achieve a significantly narrowed frame in the non-display area ED of the mounting side, a structure in the light-source side portion of the backlight device 20 is different from that of the conventional techniques. Moreover, in order to further thin the structure, the case (bezel) formed into a box shape by pressing sheet metal is omitted from the backlight device 20.

Figure 4:
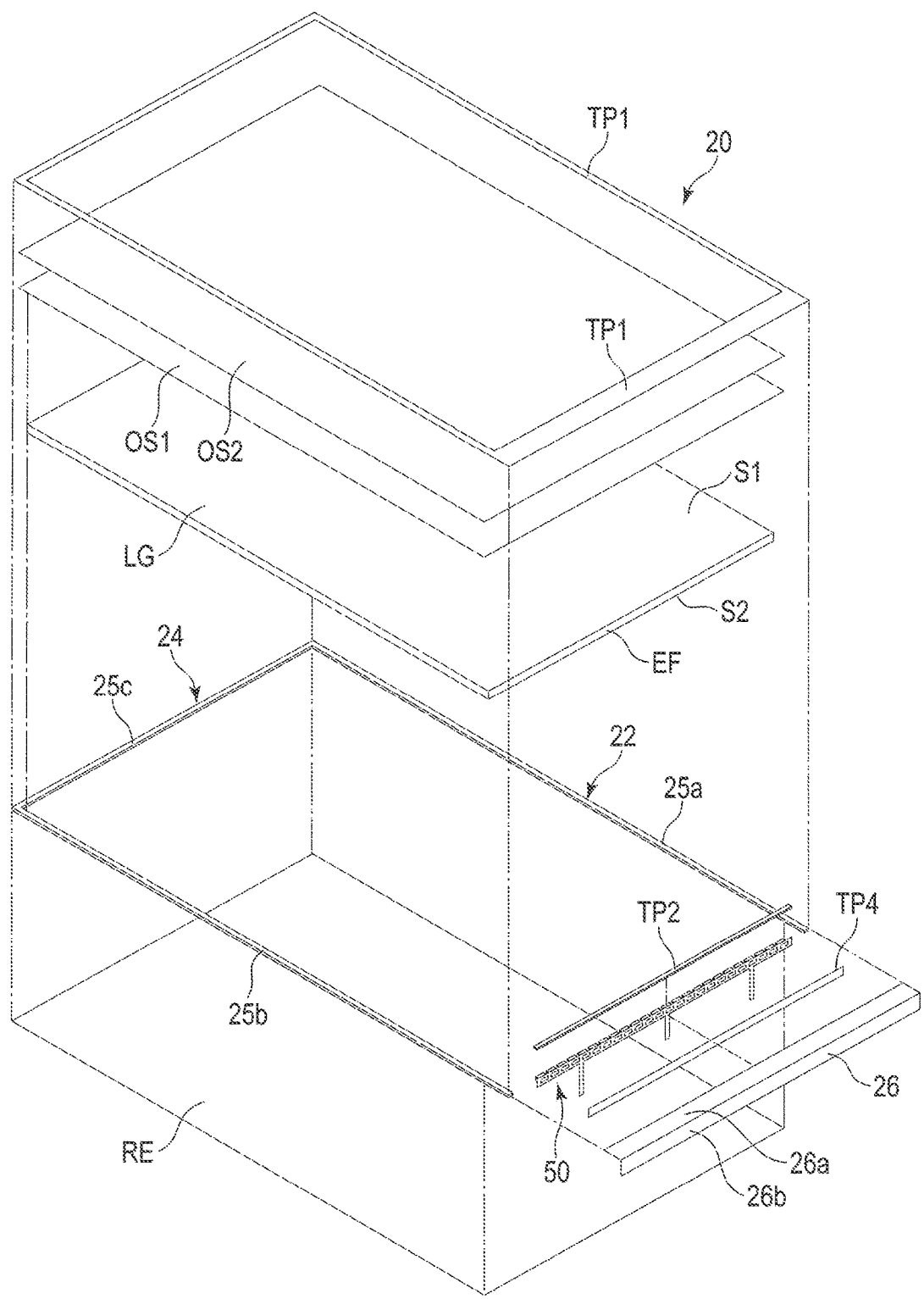
FIG. 4 is an exploded perspective view of a backlight device of the liquid crystal display device.
Figure 6A:
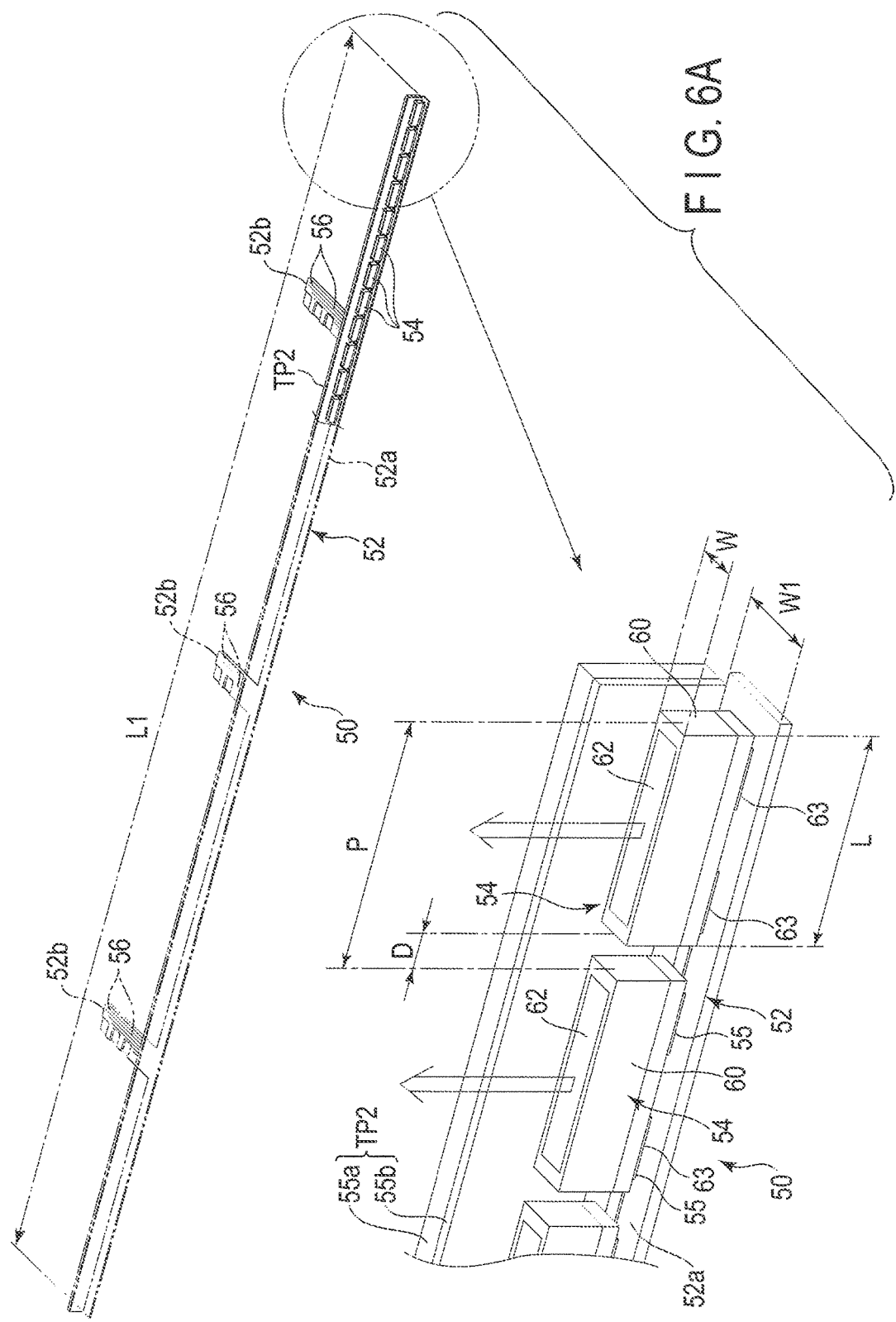
FIG. 6A is a perspective view showing a light source unit of the backlight device.

FIG. 4 is an exploded perspective view of the backlight device 20. FIG. 5 is a perspective view schematically showing the support frame. FIG. 6A includes perspective views of the light source unit, each including a partially expanded view thereof. FIG. 7 is a perspective view of the light source-side end portion of the liquid crystal display device. FIG. 8 is a cross sectional view of the liquid crystal display device taken along line A-A in FIG. 1. FIG. 9 is a cross section view of the long edge-side portion of the liquid crystal display device taken along line B-B in FIG. 1.

As shown in FIG. 4, the backlight device 20 comprises a flat rectangular support frame 22, a reflective sheet attached to a first surface (lower end surface) of the support frame 22, a plurality of optical members arranged in the support frame 22 and a light source unit 50 supported by the support frame 22.

As shown in FIGS. 4 and 5, the support frame 22 comprises, for example, a U-shaped resin frame (first frame body) 24 molded form a synthetic resin and a metal member (second frame body) 26 fixed to the resin frame 24 to form one side portion of the support frame 22. The resin frame 24 includes a pair of long frame members (first frame members) 25a and 25b opposing each other and a first short frame member (second frame member) 25c connected to the one end portion of each of the long frame members 25a and 25b, as one integrated body. The resin frame 24 comprises a first surface (upper end surface) 24a and a second surface (lower end surface) 24b on an opposite side thereto. A stepped portion 24c, which is one step lower, is formed in an inner circumference of the first surface 24a. The stepped portion 24c is continuously formed in the long frame members 25a and 25b and the first short frame member 25c all around its full length.

As shown in FIG. 9, the long frame members 25a and 25b and the first short frame member 25c are formed, for example, to have a width W1 of 0.4 to 0.5 mm and a height (thickness) T1 of about 0.3 to 0.5 mm. The step difference (depth) T2 of the stepped portion 24c is made substantially equal to the thicknesses of two films, i.e., a film thickness of a first optical sheet OS1 and that of a second optical sheet OS2, which will be described later.

As shown in FIGS. 4, 5 and 7, the metal member 26 is fixed to the end portions of the long frame members 25a and 25b. In other words, the metal member 26 forms the second short frame member which opposes the first short frame member 25c. The metal member 26 is, for example, a stainless plate (SUS board) having a thickness of 0.3 mm. The metal member 26 is bent to have an L-shaped cross section. Thus, the metal member 26 includes an oblong first plate portion 26a and an oblong second plate portion 26b perpendicularly to the first plate portion 26a, as an integrated body.

Both longitudinal end portions of the first plate portion 26a are attached to the first surface 24a of the end portions of the long frame members 25a and 25b and both longitudinal end portions of the second plate portion 26b are attached respectively to the end portions of the long frame members 25a and 25b with an adhesive member TP7 such as a double-stick tape. As shown in FIG. 7, a width W2 of the second plate portion 26b is greater than the height T1 of the resin frame 24. With this structure, the second plate portion 26b extends over the second surface 24b of the resin frame 24.

The width of the support frame 22 is substantially equal to a width of the first polarizer PL1 of the liquid crystal panel 12. The length of the support frame 22 is slightly greater than a length of the first polarizer PL1.

It should be noted that wordings such as "identical" and "equal" in dimensions are not to positively exclude errors inevitable in the manufacture of the actual product or previously allowing a tolerance for such errors at the time of design, and include, from this point of view, those which can be the to be approximately identical to each other. The same applies to the description after this.

As shown in FIGS. 4, 7, 8 and 9, the backlight device 20 includes, as optical members, a reflective sheet RE having a rectangular shape in planar view, a light guide LG, a plurality of, for example, two, first optical sheets OS1 and second optical sheets OS2. The number of optical sheets is not limited to two, but three or more sheets may be used. For example, as the first optical sheets OS1, a diffusion sheet is employed, whereas a prism sheet is employed as the second optical sheets OS2.

The reflective sheet RE has external dimensions substantially equal to the external dimensions of the resin frame 24. The reflective sheet RE has a thickness of 200 μm or less, preferably, 50 to 90 μm and a reflectivity of 90% or higher, preferably, 95% or higher. Three side edge portions of the reflective sheet RE are attached to the second surface 24b of the resin frame 24 with an adhesive member TP3 such as a double-stick tape. Thus, the reflective sheet RE covers substantially the entire surface of the second surface 24b. One short side edge of the reflective sheet RE opposes the metal member 26 with a gap therebetween.

The light guide LG comprises a first main surface S1, a second main surface S2 opposing the first main surface S1 and a plurality of, for example, a pair of long-side surfaces and a pair of short-side surfaces, which connect side edges of the first main surface S1 and the second main surface S2 to each other. In this embodiment, one short-side surface constitutes the incidence surface EF of the light guide LG. The light guide LG has, for example, a thickness of about 0.23 to 0.32 mm. Moreover, the light guide LG is formed from, for example, a resin such as polycarbonate, an acrylic or silicon resin.

The light guide LG has dimensions (length and width) slightly smaller than the internal dimensions of the support frame 22 and slightly larger than the display area DA of the liquid crystal panel 12 in plan view. The light guide LG is arranged in the support frame 22 and placed on the reflective sheet RE while the second main surface S2 opposes the reflective sheet RE. Thereby, the first main surface (emission surface) S1 of the light guide LG is located substantially parallel to the reflective sheet RE and the incidence surface EF is located substantially perpendicular to the reflective sheet RE.

As shown in FIG. 8, an incidence-side end of the light guide LG projects from a border BD between the display area DA and the non-display area ED of the liquid crystal panel 12 towards the metal sheet member 26. The distance between the incidence surface EF of the light guide LG and the second plate portion 26b of the metal sheet member 26 is preferably 1.0 mm or less, more preferable 0.8 mm or less, and still more preferably, 0.5 mm or less. In the conventional backlight devices, the distance between the incident surface of the light guide and the side wall of the case corresponds to the above-described distance. Conventionally, the distance is set to about 3.0 mm to 4.0 mm. As compared to the conventional structure, the distance between the metal sheet member 26 of the support frame 22 and the light guide LG in this embodiment is remarkably less. Then, the light source unit 50 is provided between the metal sheet member 26 and the light guide LG.

A light source-side end REa of the reflective sheet RE projects over the border BD and the incidence surface EF towards the light source. With this structure, the end REa of the reflective sheet RE opposes to the second plate portion 26b of the metal sheet member 26 with a gap, as well as part of the light sources of the light source unit 50.

As shown in FIGS. 5 and 6A, the light source unit 50 comprises, for example, a belt-shaped wiring board 52 and a plurality of light sources mounted in lines on the wiring board 52. As light sources, light-emitting elements, for example, light-emitting diodes (LEDs) 54 are employed.

A flexible printed circuit board (FPC) is used for the wiring board 52. That is, the wiring board 52 includes an insulating layer formed from polyimide or the like and a conductive layer such as a copper foil, formed on the insulating layer. The conductive layer is patterned to form a plurality of contact pads 55 and wiring lines 56.

The wiring board 52 includes a belt-shaped mounting portion (mounting region) 52a and a plurality of, for example, three belt-shaped lead-out portions (wiring regions) 52b extending substantially perpendicularly from one side edge of the mounting portion 52a, all integrated as one body. A length L1 of the mounting portion 52a is substantially equal to a length of the incidence surface EF of the light guide LG. The lead-out portions 52b are arranged to be spaced from each other in a longitudinal direction of the mounting portion 52a.

The contact pads 55 are formed in the mounting portion 52a and are arranged in a longitudinal direction of the mounting portion 52a. The wiring lines 56 extend respectively from the contact pads 55 to the lead-out portions 52b and are routed on the lead-out portions 52b.

As shown in FIG. 6A, the LEDs 54 used here are each a top-view type LED. Each LED 54 comprises a substantially rectangular parallelepiped case (package) 60 formed of a resin, for example. An upper surface of the case 60 forms a light-emitting surface 62 and a bottom surface of the case 60, which is located on an opposite side to the light-emitting surface 62, forms a mounting surface. Contact terminals 63 are provided on the bottom surface of the case 60.

Note that each LED 54 is formed into substantially a rectangular parallelepiped, but the shape is not limited to this. For example, the LED 54 may comprise projections and recesses in side surfaces, or may be formed into a curvy shape.

As to each LED 54, the bottom of the case 60 is mounted on the mounting portion 52a of the wiring board 52, and thus the contact terminals 63 are electrically connected to the contact pads 55. The light-emitting surface 62 of the LED 54 is set substantially parallel to the wiring board 52, and the LED 54 emits light from the light-emitting surface 62 in a direction substantially perpendicular to the wiring board 52.

The LEDs 54 are mounted on the mounting portion 52a so that the longitudinal direction of the case 60 is aligned with the longitudinal direction of the mounting portion 52a. The width W1 of the mounting portion 52a is 1.1 to 1.5 times the width W of the LED 54. In this embodiment, the light source unit 50 includes a plurality of LEDs 54, the number of which may vary according to the width of the display area DA. The number of the LEDs installed is about 2.5 to 3 times that of the conventional structure of the same display area. The LEDs 54 are arranged in one row on the mounting portion 52a from one longitudinal end to the other of the mounting portion 52a.

Note that in this embodiment, an arrangement pitch P of the LEDs 54 is set to about 1.1 to 1.5 times of the length L of each LED 54 in the aligning direction, and a gap D of each adjacent pair of LEDs 54 is set to about 10% to 50% of the length L of the LEDs 54. Conventionally, the arrangement pitch of LEDs is set to two times or more the length of the LEDs. In this embodiment, the gap D between the LEDs 54 is set narrower than conventional cases, and thus the region of uneven brightness, which may be generated between each adjacent pair of light sources, can be narrowed.

In this embodiment, a belt-shaped fixing tape (light-shielding tape) TP2 as a second adhesive member for fixing and positioning each LED 54 is adhered onto a side surface of each of the LEDs 54. The fixing tape TP2 is used such that about a half of the region in a width direction is adhered to each LED 54, and a remaining half of the region is adhered to the light guide LG. The fixing tape TP2 comprises a belt-shaped base material 55a formed of, for example, polyethylene terephthalate (PET), and an adhesive layer 55b or sticker layer formed on at least one surface of the base material 55a. Further, at least one of the base material 55a and the adhesive layer 55b is colored in black with, for example, fine black particles, black ink or the like. Thus, the fixing tape TP2 forms a light-shielding member with light shielding property. The fixing tape TP2 employed here is not limited to one continuous tape, but may be of a plurality of divided fixing tapes.

Figure 6B:
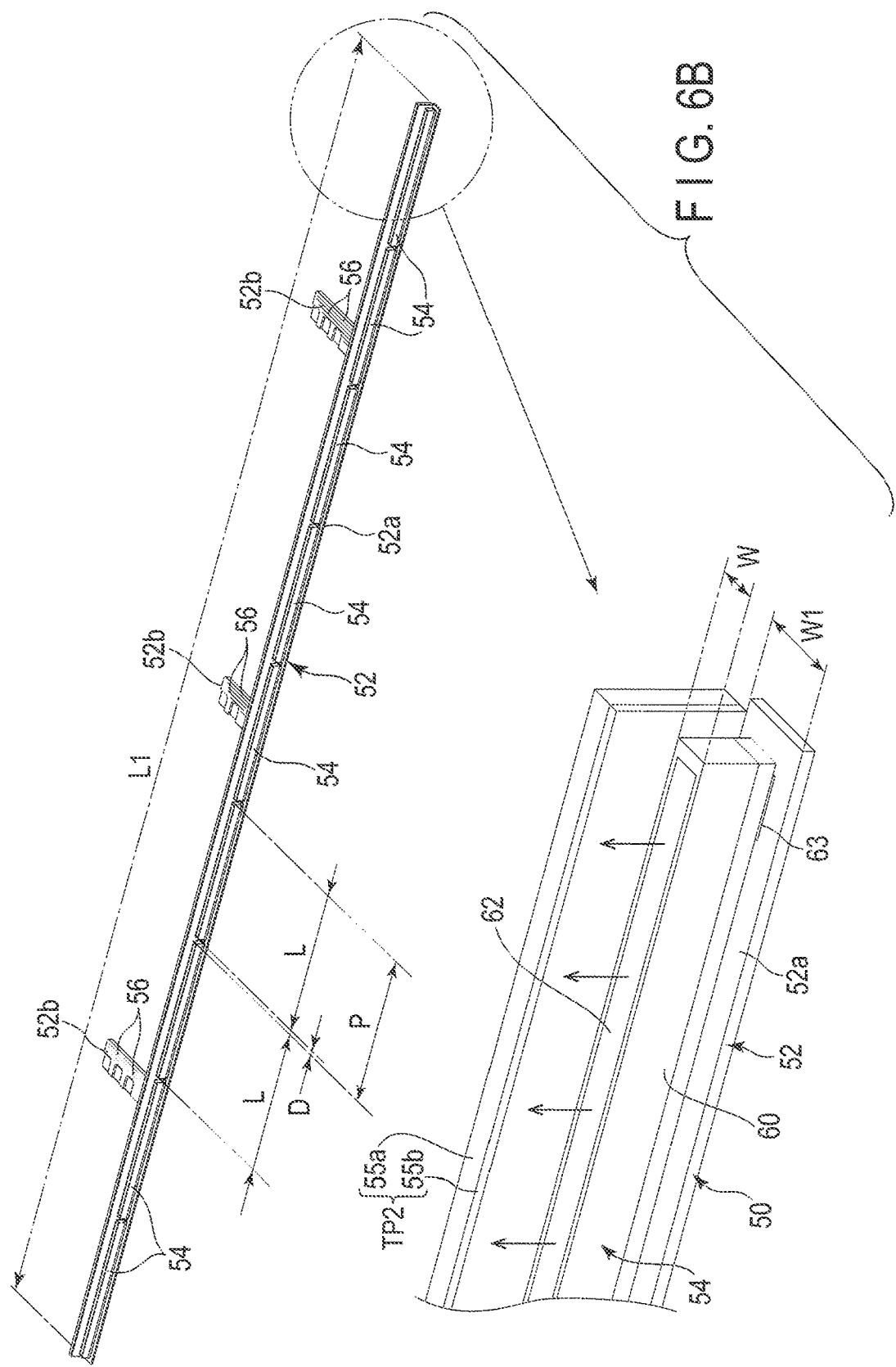
FIG. 6B is a perspective view showing an optical unit of the backlight device according to a modification.

The number of LEDs 54 mounted may be increased or decreased as needed. When LEDs longer than the length L1 are used, the number of LEDs to be mounted may be decreased. According to a modification shown in FIG. 6B, the length L1 of the LEDs 54 is set to about 4 to 5 times that of the LEDs 54 shown in FIG. 6A. The width W1 of the mounting portion 52a of the wiring board 52 is 1.1 to 1.5 times the width W1 of the LEDs 54. The arrangement pitch P of the LEDs 54 is set to about 1.1 to 1.5 times the length L1 of the LEDs 54, and the gap D between adjacent pairs of LEDs 54 is about 10% to 50% of the length L1 of the LEDs 54.

As shown in FIGS. 4 and 8, the light source unit 50 configured as described above is arranged in the support frame 22. The mounting portion 52a of the wiring board 52 and the LEDs 54 are arranged between the incidence surface EF of the light guide LG and the second plate portion 26b of the metal sheet member 26. The light-emitting surfaces 62 of the LEDs 54 oppose or abut against the incidence surface EF. The mounting portion 52a of the wiring board 52 is attached to the inner surface of the second plate portion 26b by an adhesive member, for example, a double-stick tape TP4. The mounting portion 52a opposes the incidence surface EF via the LEDs 54 interposed therebetween.

The LEDs 54 each comprises four side surfaces perpendicularly crossing the light-emitting surface 62. Of the four side surfaces, a side surface 54b located on a liquid crystal panel 12 side is arranged to be substantially flush with the second main surface S2 of the light guide LG. The fixing tape TP2, more specifically, about a half of the region in its width direction, is adhered on the surface side 54b of the LED 54, and the rest of the half is adhered onto an incidence surface-side end of the first main surface S1. Thus, the LEDs 54 are fixed to the light guide LG via the fixing tape TP2, and the light-emitting surface 62 is positioned to abut against the incidence surfaces EF of the light guide LG. Further, the fixing tape TP2 shields the side surface 54b side of each LED 54 to inhibit light from leaking from the LEDs 54.

According to this embodiment, the base material 55a of the fixing tape TP2 is provided to abut against the inner surface of the first plate portion 26a of the metal sheet member 26. The fixing tape TP2 is interposed between the first plate portion 26a and the LEDs 54 and held to attach to the LEDs 54 and the light guide LG.

According to this embodiment, as the first optical sheet OS1 and the second optical sheet OS2, a light-transmissive diffusion sheet and a light-transmissive prism sheet, formed from, for example, a synthetic resin such as polyethylene terephthalate, are used. As shown in FIGS. 4, 8 and 9, the first optical sheet OS1 is formed into a rectangular shape having external dimensions larger than the internal dimensions of the resin frame 24 and smaller than the external dimensions thereof. The length of the first optical sheet OS1 is less than that of the resin frame 24 and that of the light guide LG.

The first optical sheet OS1 is overlaid on the first main surface S1 of the light guide LG, to cover substantially the entire first main surface S1. The three side edge portions of the first optical sheet OS1, excluding the short edge on the light source unit 50 side, are placed on the stepped portion 24c of the resin frame 24.

The second optical sheet OS2 is formed into a rectangular shape having dimensions identical to those of the first optical sheet OS1. The second optical sheet OS2 is overlaid on the first optical sheet OS1, to cover substantially the entire first optical sheet OS1. The edge portions of the second optical sheet OS2 are attached to the edge portions of the first optical sheet OS1 with a frame-shaped adhesive member, for example, a double-stick tape TP5. The double-stick tape TP5 is colored in black with, for example, fine black particles, black ink or the like. Thus, the double-stick tape TP5 has a light-shielding property.

The three side edge portions of the second optical sheet OS2, excluding the short edge on the light source unit 50 side, and the double-stick tape TP5 are placed on the stepped portion 24c of the resin frame 24. Thus, the upper surface (the surface on the liquid crystal panel 12 side) of the second optical sheet OS2 is located to be flush with the first surface 24a of the resin frame 42. As shown in FIG. 8, the short edge portions of the first optical sheet OS1 and the second optical sheet OS2 and the double-stick tape TP5 extend to the non-display area ED and are substantially aligned with the light source-side short edge of the first polarizer PL1 of the liquid crystal panel 12. Further, the short edge is located just in front of the incident surface EF of the light guide LG to oppose the fixing tape TP2 with a slight gap therebetween. That is, the double-stick tape TP5 having light-shielding property is disposed in the vicinity of the LED 54, and can contribute to the shielding of the light leaking from the case of the LED 54.

As shown in FIGS. 3, 8 and 9, the rectangular frame-shaped first adhesive member, that is, for example, the double-stick tape TP1, is attached on the upper end surface of the support frame 22. Three edge portions of the double-stick tape TP1 each have a width equal to the width W1 of the resin frame 24 and are stacked and attached on the first surface 24a of the resin frame 24 and the edge portions of the second optical sheet OS2. With the double-stick tape TP1, the second optical sheet OS2 and the first optical sheet OS1 are fixed and positioned to the resin frame 24. The other one edge TP1a of the double-stick tape TP1 has a width substantially equal to the width of the first plate portion 26a of the metal member 26 and is overlaid and attached on the entire first plate portion 26a.

At least the edge TP1a of the double-stick tape TP1 should preferably have a light-shielding property. According to this embodiment, the double-stick tape TP1 is colored in black with, for example, fine black particles, black ink or the like. Thus, the double-stick tape TP1 has a light-shielding property. The edge TP1a of the double-stick tape TP1 opposes the LEDs 54 via the metal member 26. Thus, the double-stick tape TP1 can contribute to the shielding of the light leaking from the case of the LED 54.

As described above, on the liquid crystal panel 12 side of the LED 54, the light-shielding fixing tape TP2, double-stick tape TP5 and double-stick tape TP1 are provided, and the light leaking from the case of LED 54 can be shield in triple by these light-shielding members.

As shown in FIGS. 2 and 8, according to this embodiment, the backlight device 20 may comprise a heat-radiating sheet 70. The heat-radiating sheet 70 is formed from, for example, a highly heat conductive material such as graphite. The heat-radiating sheet 70 is laid on the location opposing the light source unit 50 and attached onto an outer surface of the second plate portion 26b of the metal member 26 and the back surface of the reflective sheet RE. The heat generated by the LEDs 54 propagates to the metal member 26 having large heat capacitance through the wiring board 52 and further from the metal member 26 to the heat-radiating sheet 70. Further, part of the heat generated from the LEDs 54 directly propagates to the heat-radiating sheet 70. The heat which has propagated to the heat-radiating sheet 70 radiates to the outside from the heat-radiating sheet 70, and part of the heat is transmitted from the heat-radiating sheet 70 to the reflective sheet RE, which radiates to the outside from the reflective sheet RE. Thus, an excessive increase in temperature of the light sources of the light source unit 50 can be suppressed, thereby making it possible to prevent a local increase in temperature in the backlight device 20.

The backlight device 20 configured as above is attached on the back of the liquid crystal panel 12 with the frame-shaped double-stick tape TP1. As shown in FIGS. 2, 7 to 9, the resin frame 24 is attached to on the edge portions of the first polarizer PL1 with the double-stick tape TP1. The metal member 26 of the support frame 22 is stuck to the back of the first substrate SUB1 with the double-stick tape TP1. The second optical sheet OS2 opposes the entire first polarizer PL1 with a gap therebetween. Further, the light source unit 50 is located to overlap the non-display area ED.

In the liquid crystal display 10 configured as above, the box-shaped case (bezel) where the optical members and the light source unit are accommodated is omitted from the backlight device 20. By omitting the case, the display can be downsized by the thickness of the case and the width of the frame portion. Moreover, one edge portion of the support frame 22 is formed from the metal member 26, and therefore the mechanical strength of the support frame 22 can be enhanced, making it possible to stably support the structural members of the backlight device 20, especially those on the light source side where a number of members are densely concentrated, by the support frame 22. More specifically, the light source unit 50, which relatively heavy, is attached to the metal member 26, and thus the light source unit 50 can be firmly supported at a predetermined position. Furthermore, the structural members of the backlight device 20 is attached to the liquid crystal panel 12 via the support frame 22 or the double-stick tape (adhesive member) TP1. Thus, the structural members of the backlight device 20 are held in the liquid crystal panel 12, securing the strength. As a result, even if the conventional case is omitted, the liquid crystal display 10 exhibits a desired strength as a whole. The light source unit 50 employs top-view LEDs 54, thereby making it possible to arrange the wiring board 52 of the light source unit 50 to oppose the incident surface EF of the light guide LG while interposing the LEDs 54 therebetween. With this structure, the wiring board 52 does not interfere with optical members such as the optical sheet OS and the light guide LG or the display area DA of the liquid crystal panel 12, thereby making it possible to reduce the frame area ED on the light source side in great deal.

Moreover, according to this embodiment, the fixing tape (second adhesive member) TP2 is attached continuously over the side surfaces of the LEDs 54 and the second main surface S2 of the light guide LG, to position and fix the LEDs 54 with respect to the light guide LG. Thus, the LEDs 54 can be held while the light-emitting surfaces thereof abut against the incident surface EF of the light guide LG, and thus the optical axis of each LED 54 can be accurately adjusted with respect to the incident surface EF. Furthermore, the fixing tape TP2 has a light-shielding property, and therefore it can shield the light leaking from the side surface of the case of the LEDs 54 and also the light leaking from the boundary between each of the light-emitting surfaces of the LEDs 54 and the light guide LG. Thus, the light leaking from the light sources can be suppressed more reliably, thereby improving the display quality of the display device. Furthermore, the light-shielding double-stick tape TP5 and double-stick tape TP1 are provided to be adjacent to or overlaid on the LEDs 54. With this structure, the light leaking from the side surface of the case of the LEDs 54 and also the light leaking from the boundary between each of the light-emitting surfaces of the LEDs 54 and the light guide LG can be more reliably shielded by the double-stick tapes TP1 and TP5.

As described above, according to this embodiment, a backlight device which can be thinned and reduce the width of the frame, and a liquid crystal display device comprising the backlight device can be provided.

Now, a liquid crystal display device according to another embodiment will be explained. In the other embodiment described below, the same structural elements as those of the first embodiment are denoted by like reference numbers, detailed description thereof being omitted or simplified. Structural elements different from those of the first embodiment are mainly explained in detail.

FIG. 10 is a cross section of a light source-side end of a liquid crystal display according to another embodiment. This embodiment is different from the one described in the positions where the LEDs 54 of the light source unit 50 are arranged. More specifically, as shown in FIG. 10, the light source unit 50 is attached to a metal member (second frame member) 26 of the support frame 22. The light source unit 50 comprising a wiring board 52 and a plurality of LEDs 54 mounted on the wiring board 52. The wiring board 52 is attached to a second plate portion 26b of the metal member 26 with a double-stick tape TP4. The LEDs 54 are located between an incident surface EF of the light guide LG and the wiring board 52. A light-emitting surface 62 of each of the LEDs 54 opposes the incident surface EF or abuts against the incident surface EF. In this embodiment, the LEDs 54 are arranged in such positions that lower side surfaces thereof (side surfaces side opposite to the liquid crystal panel 12) are substantially flush with a second main surface S2 of the light guide LG. End portions of the LEDs 54, which are on a light-emitting surface 62 side are mounted on a light source-side end REa of a reflective sheet RE.

A light-shielding tape TP2, for example, a double-stick tape, is attached as an adhesive member onto the first plate portion 26a of the metal member 26. A part of light-shielding tape TP2 is attached onto the first main surface S1 of the light guide LG. Such a structure can be adopted that the light source unit 50 is attached to the metal member 26 with the double-stick tape TP2. Note that the double-stick tape TP2 is colored in black with, for example, fine black particles, black ink or the like. Thus, the double-stick tape TP2 has a light-shielding property. The edge TP1a of the double-stick tape TP1 opposes the LEDs 54 via the metal member 26. Thus, the double-stick tape TP1 can contribute to the shielding of the light leaking from the case of the LEDs 54. Moreover, as shown in FIG. 10, the thickness of the light guide LG is slightly greater than the height of the LEDs 54. Here, the process of mounting LEDs 54 on the wiring board 52 is considered to involve an attachment error which is difficult to avoid during actual manufacture especially in the height direction of the LEDs 54. However, the above-described structure can cope with this kind of LED attachment error. Furthermore, above the LEDs 54, the light-shielding tape TP2 is continuously provided from the wiring board 52 over to the incident surface EF of the light guide LG. Therefore, even if such attachment error of LEDs 54 may occur, the leakage of light resulting from such error can be suppressed as much as possible.

In this embodiment, the other structure of the liquid crystal display 10 is the same as that of the embodiment previously described. Further, with the back light device and the liquid crystal display of this embodiment configured as above, an advantageous effect similar to that of the previous embodiment can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Note that all the structures and production steps which can be carried out by any modification and variation conceived within the scope and spirit of the invention by a person having ordinary skill in the art based on each structural elements described in the embodiments are naturally encompassed in the scope of invention of the present application. Further, regarding the present embodiments, any advantage and effect which would be obvious from the description of the specification or arbitrarily conceived by a skilled person are naturally considered achievable by the present invention.

For example, the light-shielding member is not limited to a double-stick tape or a light-shielding tape, but the black printing, a light-shielding film or some other light-shielding layer may be used. The outer and inner shapes of the structural members of the liquid crystal panel and backlight device are not limited to rectangular, but one or both of the outer and inner shapes may be polygonal, circular, elliptical or combination of any of these in plan view. The materials of the structural members are not limited to those described in the example provided above, but may be selected from various types. The liquid crystal panel is not limited to a flat type, but may be partially or entirely curved.

Further, in the embodiments, the U-shaped first frame body 24 is formed from a resin and the second frame body 26 fixed to the first frame member 24 is from a sheet metal. But, such a structure may be adapted that these materials are switched from one another, or both of these members are formed from a resin or a metal.

What is claimed is:

1. A backlight device comprising:
   a support frame comprising a first frame body including a pair of first frame members opposing each other and a second frame member connected to respective ends of the first frame members, and a second frame body formed to be separate from the first frame body, which connects other respective ends of the first frame members to each other and opposes to the second frame member;
   a reflective sheet on a first surface of the support frame;
   a light guide on the reflective sheet within the support frame;
   an optical sheet on the light guide; and
   a light source unit disposed in the support frame and comprising a wiring board fixed on the second frame body and a light source on the wiring board, opposing an incidence surface of the light guide.

2. The backlight device of claim 1, wherein
the light guide comprises a first main surface which forms a light-emitting surface, a second main surface opposing the first main surface and the incident surface located between end portions of the first main surface and the second main surface, the second main surface opposes to the reflective sheet, and the incident surface opposes the second frame body with a gap therebetween, and
the wiring board opposes the incident surface while interposing the light source therebetween.

3. The backlight device of claim 2, wherein
the first frame body comprises a second surface opposing the first surface, and
the second frame body comprises a first plate portion opposing the second surface of the first frame body and a second plate portion opposing the incident surface while interposing the light source unit therebetween.

4. The backlight device of claim 3, further comprising a light-shielding member between the light source and the first plate portion.

5. The backlight device of claim 3, further comprising a first adhesive member stacked on the second surface of the first frame body and the first plate portion of the second frame body,
wherein at least a portion of the first adhesive member, which is located on the first plate portion has a light-shielding property.

6. The backlight device of claim 5, wherein
the optical sheet includes a first optical sheet on the light guide and a second optical sheet on the first optical sheet, the second optical sheet includes an end portion on a side of the light source unit, and the end portion is attached to the first optical sheet with a light-shielding adhesive layer.

7. The backlight device of claim 1, further comprising a heat-radiating sheet attached onto the second frame body and the reflective sheet.

8. The backlight device of claim 1, wherein
the reflective sheet comprises a light source-side end extending over the incident surface of the light guide to a position opposing the light source.

9. The backlight device of claim 1, wherein
the first frame body is formed from a resin and the second frame body is formed from a metal.

10. A liquid crystal display comprising:
a liquid crystal panel comprising a first substrate, a second substrate opposed to the first substrate and a liquid crystal layer between the first substrate and the second substrate;
a backlight device opposed to the first substrate,
the backlight device comprising:
a support frame comprising a first frame body including a pair of first frame members opposing each other and a second frame member connected to respective ends of the first frame members, and a second frame body formed to be separate from the first frame body, which connects other respective ends of the first frame members to each other and opposes to the second frame member;
a reflective sheet on a first surface of the support frame;
a light guide on the reflective sheet within the support frame;
an optical sheet on the light guide; and
a light source unit disposed in the support frame and comprising a wiring board fixed on the second frame body and a light source on the wiring board, opposing an incidence surface of the light guide.

11. The liquid crystal display of claim 10, wherein the first frame body comprises a second surface opposing the first surface, and
the second surface of the support frame is attached to the liquid crystal panel via an adhesive member.

12. The liquid crystal display of claim 10, further comprising a heat-radiating sheet attached onto the second frame body and the reflective sheet.

13. The liquid crystal display of claim 10, wherein the reflective sheet comprises a light source-side end extending over the incident surface of the light guide to a position opposing the light source.

14. The liquid crystal display of claim 10, wherein the first frame body is formed from a resin and the second frame body is formed from a metal.

* * * * *